United States Patent
Moehrle

(10) Patent No.: US 6,599,130 B2
(45) Date of Patent: Jul. 29, 2003

(54) ITERATIVE VIDEO TEACHING AID WITH RECORDABLE COMMENTARY AND INDEXING

(75) Inventor: Armin Moehrle, Chicago, IL (US)

(73) Assignee: Illinois Institute of Technology, Chicago, IL (US)

(*) Notice: Subject to any disclaimer, the term of this patent is extended or adjusted under 35 U.S.C. 154(b) by 128 days.

(21) Appl. No.: 09/775,463

(22) Filed: Feb. 2, 2001

(65) Prior Publication Data

US 2002/0106623 A1 Aug. 8, 2002

(51) Int. Cl.$^7$ ................................................ G09B 11/00
(52) U.S. Cl. .................... 434/365; 434/219; 434/307 R
(58) Field of Search .............................. 707/512, 300; 434/262, 322, 365, 307 R; 600/217, 345

(56) References Cited

U.S. PATENT DOCUMENTS

| | | | |
|---|---|---|---|
| 4,416,293 A | | 11/1983 | Anderson et al. |
| 4,818,938 A | | 4/1989 | Sattin et al. |
| 4,945,410 A | | 7/1990 | Walling |
| 4,974,178 A | | 11/1990 | Izeki et al. |
| 5,208,748 A | | 5/1993 | Flores et al. |
| 5,235,510 A | | 8/1993 | Yamada et al. |
| 5,303,148 A | | 4/1994 | Mattson et al. |
| 5,544,649 A | | 8/1996 | David et al. |
| 5,583,980 A | * | 12/1996 | Anderson .................. 345/473 |
| 5,619,995 A | | 4/1997 | Lobodzinski |
| 5,815,196 A | | 9/1998 | Alshawi |
| 5,836,877 A | | 11/1998 | Zavislan |
| 5,917,929 A | | 6/1999 | Marshall et al. |
| 5,920,317 A | * | 7/1999 | McDonald ................. 345/835 |
| 5,924,069 A | | 7/1999 | Kowalkowski et al. |
| 5,978,014 A | | 11/1999 | Martin et al. |
| 5,982,352 A | | 11/1999 | Pryor |
| 6,014,451 A | | 1/2000 | Berry et al. |
| 6,049,769 A | | 4/2000 | Holmes et al. |
| 6,230,172 B1 | * | 5/2001 | Purnaveja et al. .......... 707/500 |
| 6,332,144 B1 | * | 12/2001 | deVries et al. ............. 707/102 |
| 6,449,653 B2 | * | 9/2002 | Klemets et al. .......... 348/423.1 |
| 6,452,615 B1 | * | 9/2002 | Chiu et al. .................. 345/716 |
| 2002/0059342 A1 | * | 5/2002 | Gupta et al. ................ 707/512 |

* cited by examiner

Primary Examiner—Joe H. Cheng
Assistant Examiner—Kathleen M Christman
(74) Attorney, Agent, or Firm—Pauley Petersen Kinne & Erickson

(57) ABSTRACT

A tutorial or diagnostic aid based on the representation and iterative interpretation of visual images is taught. A teaching or diagnostic session is created by overlaying an interpretation layer via a software application onto the visual image layer and synchronizing the two with the time code of the visual image. The interpretation layer allows the reviewer to identify image areas of interest by gesture and append comments thereto in real time; i.e. images or portions of images within the visual representation playback may be identified and labeled and have the concurrent commentary associated therewith. The comments are indexed and linked to a database of similar topics. The flow of the session is recorded to show the images, deictic gestures associated therewith, and commentary associated with the gestures, to enable subsequent users to playback a session and follow the flow of thought (i.e. image identification and commentary within the original session). Iterative sessions allow additional image identification and commentary to be accomplished. Additional database access through the index may further enhance a teaching session, or provide for research sessions and report generation.

25 Claims, 5 Drawing Sheets

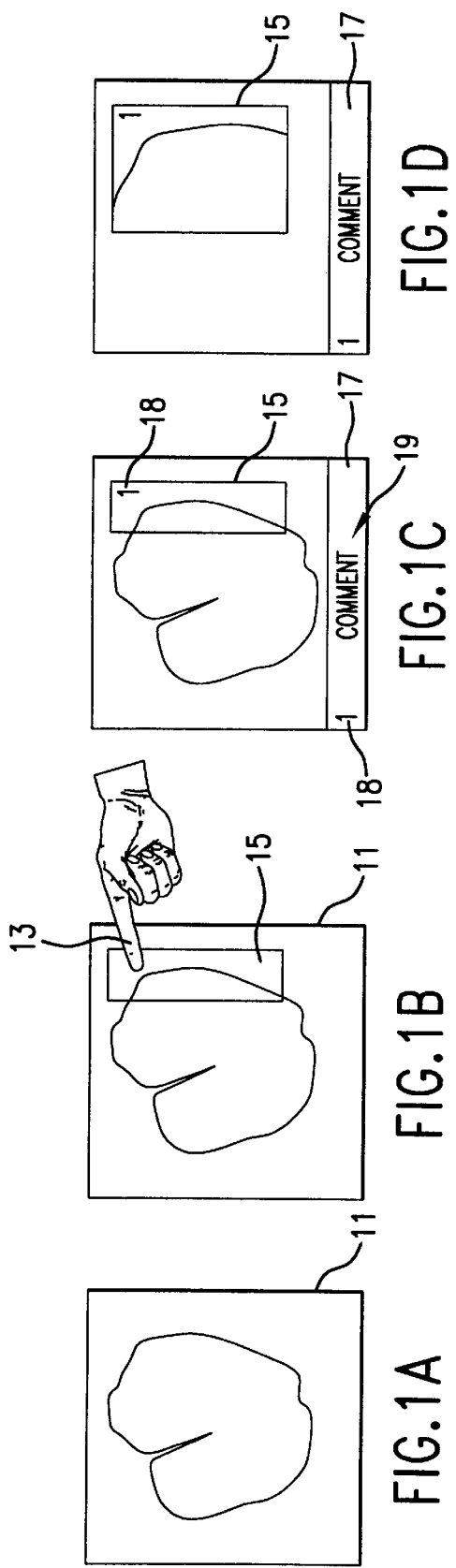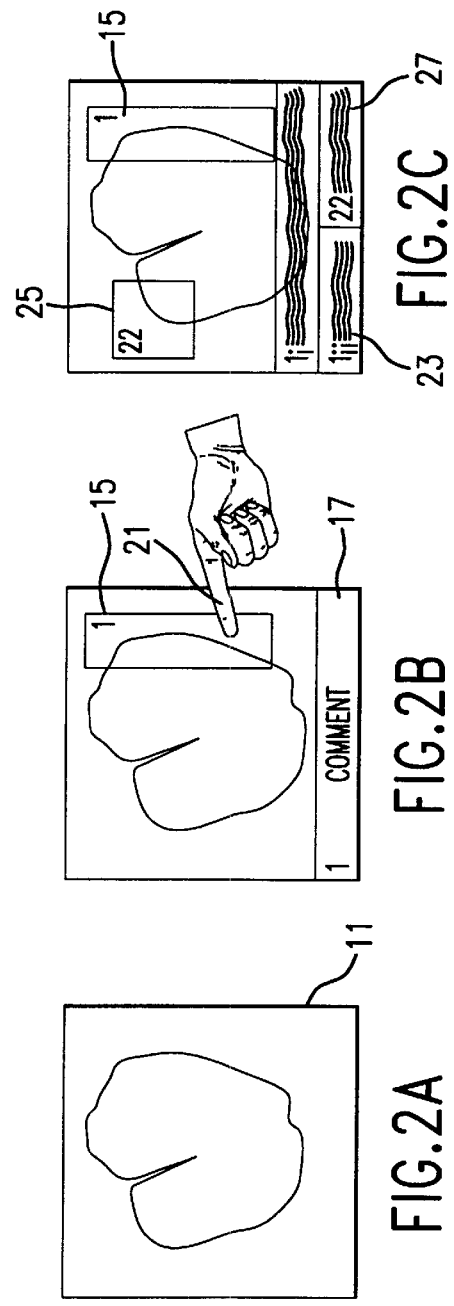

ITERATIVE VIDEO TEACHING AID WITH RECORDABLE COMMENTARY AND INDEXING

BACKGROUND OF THE INVENTION

1. Field of the Invention

The present invention relates to a teaching or diagnostic aid and/or knowledge recording system whereby images or portions of images may be selected, and labeled, and concurrent image-specific commentary applied to the visual image to create a teaching session which is indexable for later study, creation of further sessions, or research.

2. Description of the Related Art

In the diagnostic or teaching environment, such as a hospital or a medical school, great technological changes have taken place in terms of information storage, imaging, recording, and display technology. Yet the way in which knowledge is passed on has changed little. Data, or case, interpreters and learners meet in small groups and discuss individual case studies with a teacher or each other, to share knowledge and gain experience. When such sessions take place, the experiential knowledge is shared in informal and sometimes haphazard ways and only through a large number of repeated sessions is the individual's knowledge increased. Especially where the case study is in motion, e.g., a video presentation of biological events occurring in sequence over a time line, the record of such a teaching or diagnostic session is hard to establish with sufficient clarity in order to allow future users the benefit of a review of the session.

Particularly in the field of internal medicine, imaging technology has revolutionized our understanding of abnormalities in biological and neurological systems. Fast changing technological improvements, impacting the quality of the images, make it even more difficult to compare cases and build an understanding of what the normal state is. The processes for combining data interpretation, documentation and retrieval are currently inefficient or lead to a high degree of abstraction in the diagnostic record. Despite all efforts in automated image recognition, the human brain remains the best system for pattern recognition. Therefore, it would be desirable to match an image data base with appropriate indexing to the diagnostic abilities of the human data interpreter.

By way of illustration, in the medical field, a cardiologist may review live or recorded echocardiograms with medical students on a video screen in an informal session as need or opportunity arises. Deictic gestures will usually include pointing to particular areas of the screen as the cardiac events happen in time. A commentary about the image will accompany each gesture. However, when the session ends the externalized knowledge expressed in gestures and accompanying commentary during the session is largely unrecorded and unavailable for future use. All that is left is fingerprints on the screen.

Known diagnostic systems utilizing video recording and commentary are largely concerned with the image recording and display of the biological events to further automate diagnosis of the event and location of problem areas. Systems such as detailed in U.S. Pat. No. 5,619,995 to Lobodzinski or in U.S. Pat. No. 5,235,510 to Yamada et al. are sophisticated tools of medical practice but do not appear to disclose critical aspects of a teaching, or interactive interpretation, system suitable for every day use in a real world, informal, teaching hospital environment.

What is needed in such environments, and many other informal teaching or diagnostic environments, is a system whereby all aspects of a teaching, or diagnostic, session occurring around an in-motion event, including gestures and commentaries of the students and teachers, may be recorded in time-synchronized fashion to capture the knowledge expressed during the session for later use. It is desirable that such a system be easily learned and usable without special techniques. It is also desirable that the system be utilizable with a variety of video formats so as to be applicable to past and present recorded image data formats. It is further desirable that the knowledge expressed be cataloged, or indexed, for convenient retrieval and for comparison to contrasting, or similar, case studies to further heighten the efficiency of learning and sharing of experiential knowledge.

DEFINITIONS

"Frame" or "full frame" refers to an image covering the entire display screen.

"Inserted frame" refers to a full image displayed as a smaller portion inserted into the full frame analogous to a "window" or "picture in picture".

"Subframe" refers to a portion of a fill image as selected by the viewer.

"Concurrent commentary" refers to comments made at the time of, or relating to, the subframe image selection.

SUMMARY OF THE INVENTION

The present invention teaches method and apparatus for recording experiential knowledge desirably including playback of in-motion events (video), the recording of deictic gestures linked to particular images in the video, and the linking of commentary accompanying the deictic gestures, with the video images. The commentaries may then be indexed for easy retrieval and for cross-reference to images bearing on a similar topic.

In general the present invention is accomplished by overlaying an interpretation layer on the video, or image layer, to record the deictic gestures of a viewer in time and location synchronization with the video, through a software application. The interpretation layer will also record comments and associate the comments with the gestures. Put in other words, the interpretation layer will create a gesture map and comment map overlaid on the video sequence with all three being synchronized to the video, whether by time code, frame and line code, or other image identifier accompanying the video. The present invention is most efficacious with in-motion images but may work equally well with a series of static images as the image layer.

Deictic gestures may be registered by any suitable means such as mouse operated cursor, a touch screen mechanism, light pen, or other means, now known or later developed, as dictated by the functional and economic considerations of the builder or user. Commentary may be continuously recorded and coded with the video and gestures, or the act of recording a gesture may open a window for comment specific to the gesture. Commentary may be entered vocally, through a keyboard, or through a menu of comment options, or any other means suitable to the application. The video may be paused, or looped between certain frames, to more easily accommodate the user in placing more than one gesture tag in a frame. The gestures and indexed commentary may be labeled a "session" and will be indexed appropriately. Later sessions having additional gestures and commentary may be built upon a previous session.

By replaying the session, a later viewer is privy to the deictic gestures and accompanying comments of previous viewers thereby gaining a much more thorough understanding of the experiential knowledge, or areas of question, or both, expressed by the prior viewers. By linking through the index, the viewer may access any number of data bases to enhance their appreciation of the subject matter of the present session, further enhancing the value of the educational experience.

BRIEF DESCRIPTION OF THE DRAWINGS

FIGS. 1A–1D and 2A–2C illustrate teaching or diagnostic sessions of the present invention.

DESCRIPTION OF PREFERRED EMBODIMENTS

Figure 3:
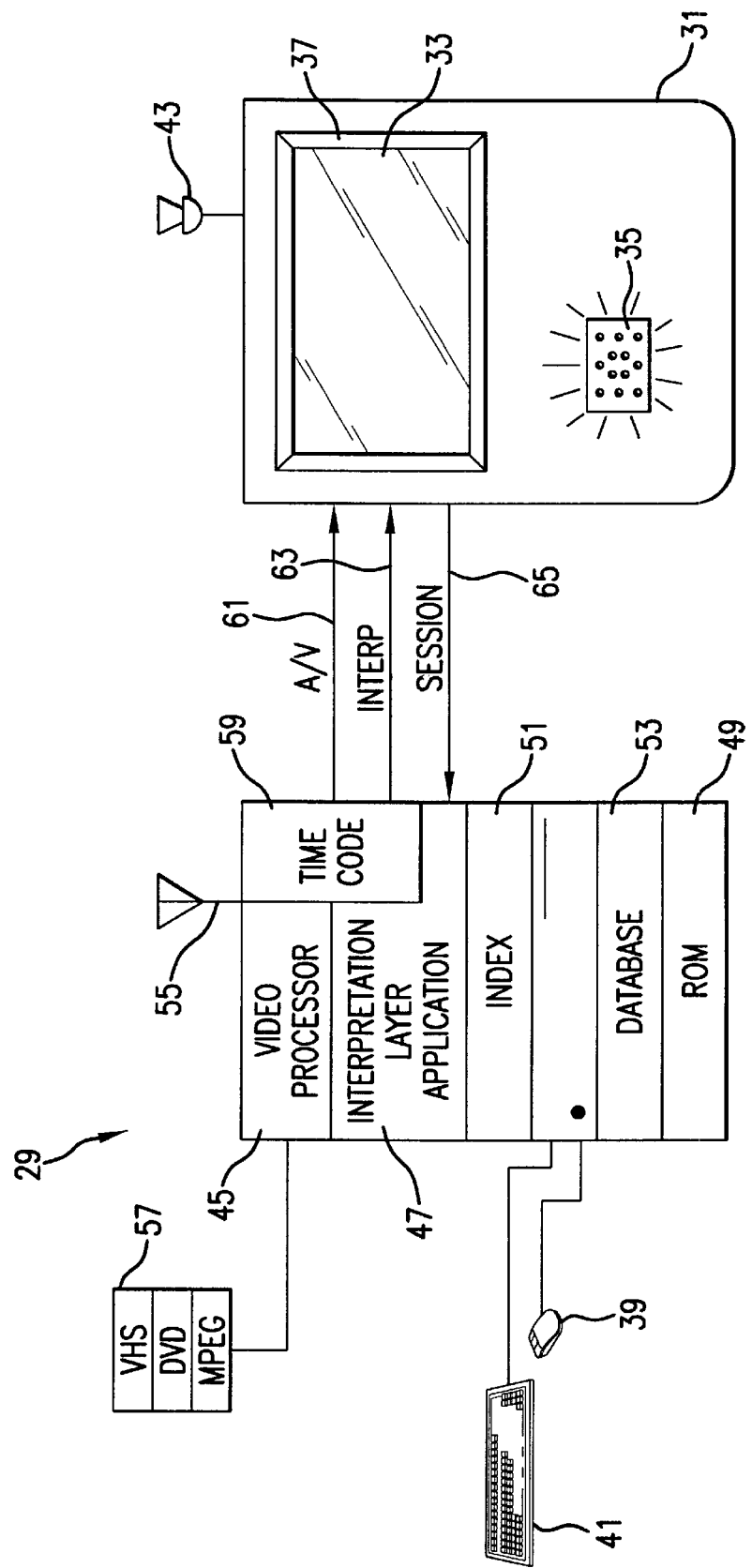
FIG. 3 is a schematic representation of an apparatus according to one embodiment of the present invention.

A preferred embodiment will be described in the context of a medical teaching or diagnostic (hereinafter simply referred to as "teaching") aid for the recording of echocardiogram review sessions. The ordinarily skilled artisan will appreciate that the present invention is applicable to teaching or review sessions in many other fields such as criminology, history, or the like, and should not be taken as limited to the discussed context, which is set forth by way of example only.

Referencing FIGS. 1A–1D, a brief portion of a teaching session is shown to illustrate some principles of the present invention. A full motion video event (hereinafter referred to simply as "video"), such as an echocardiogram, is understood to be occurring on a monitoring system. An image of interest to the image interpreter, e.g. a teacher or diagnostician, occurs on the echocardiogram in FIG. 1A. The teacher points to the image, and deictically gestures by touching at ref. no. 13 a particular area of the image designated here as a "subframe" 15 (FIG. 1B). The touch is sensed by a touch screen mechanism as known in the art and a preselected area, or an area defined by the gesture, is highlighted. The motion of the video can be paused or looped if desired. A comment window 17 is then opened in association with the selected, and concurrently labeled or "tagged", subframe, allowing comment text 19 to be entered concerning the selected subframe 15. If desired, the subframe 15 may be enlarged for further scrutiny, additional emphasis, or the like, as at FIG. 1D. Motion of the echocardiogram video is then resumed, if it has been stopped, after comment has been entered under a command from the teacher. Each deictic gesture and synonymously labeled commentary are recorded in synchronization with the video for later use.

FIGS. 2A–2C illustrate playback of the first session illustrated in FIGS. 1A–1D, and the ability of the system to add additional comments to a previously tagged subframe, or add additional subframes and comments, thereby creating another session. In FIG. 2A the replay of the recorded first session is started, showing the image 11. At FIG. 2B the first subframe 15 and its associated comment has appeared indicating to the viewer the objects of interest and commentary therein. At this point the subframe 15 may again be selected by deictic touch, as at ref. no. 21, and additional commentary added as at ref. no. 23 (FIG. 2C). Also, additional subframes, e.g., 25, may be selected with attendant comment windows 27 and comment entry. All new gestures and commentary are recorded and desirably labeled as a separate session. All commentary will desirably be indexed to aid in educational pursuit, or other decision making processes, as further explained below.

Referencing FIG. 3, exemplary apparatus for accomplishing sessions according to the present invention will include a computer 29 for control of the video and session maintenance; a display means 31, e.g., a monitor with a CRT 33 and a speaker 35, linked to the computer 29; and deictic gesture producing or capturing apparatus such as touch screen apparatus 37, a mouse 39, or keyboard 41, all linked to the computer 29. Also, comment entry apparatus such as a microphone 43 or the keyboard 41 are necessary. The mouse 39 may also be used to enter commentary from preselected menus if the semantics of the discipline for which the teaching is intended allows for same.

The computer 29 will include systems for video processing 45; the interpretation layer application 47 for operation and maintenance of the sessions; data storage 49, such as ROM, disks, or the like; an indexing application 51 for the indexing of commentary or images selected within a session; and a database and attendant applications 53 for management of broader teaching functions, such as comparing sessions or searching images, as used to supplement individual sessions. The specific construction of hardware and software applications necessary to practice the teachings of the present invention are considered to be within the skill of the person having ordinary skill in the art and therefore such specifics are left to the discretion of the individual artisan. An antenna 55 is shown to schematically indicate that sessions may be remotely sent, accessed, or shared by distance-learning techniques now known or later developed, to facilitate remote collaborative data interpretation sessions. The present invention may also include communication ports for interfacing with various networked data and/or image management systems if desired.

As indicated in FIG. 3, the video processor 45 will accept input from a variety of sources 57 of live or recorded video sources, including those transmitted from remote sources, and will time code 59 or otherwise quantify the video layer as necessary. Video may be reformatted, digitized, or the like within the scope of the present invention. The video layer time code 59 is shared with the interpretation layer 47 to synchronize the two. The interpretation layer 47, which governs gesture and comment recordation, is overlayed on the video layer as indicated schematically by separate input lines 61, 63 for video layer and interpretation, respectively. The overlay methodology is used to simplify the acceptance of multiple types of video source 57 and to protect the original video source from any data corruption. A "session" input line 65 is shown to schematically indicate capture and return of gestures and comments from the display means 31 to the computer 29.

Figure 4:
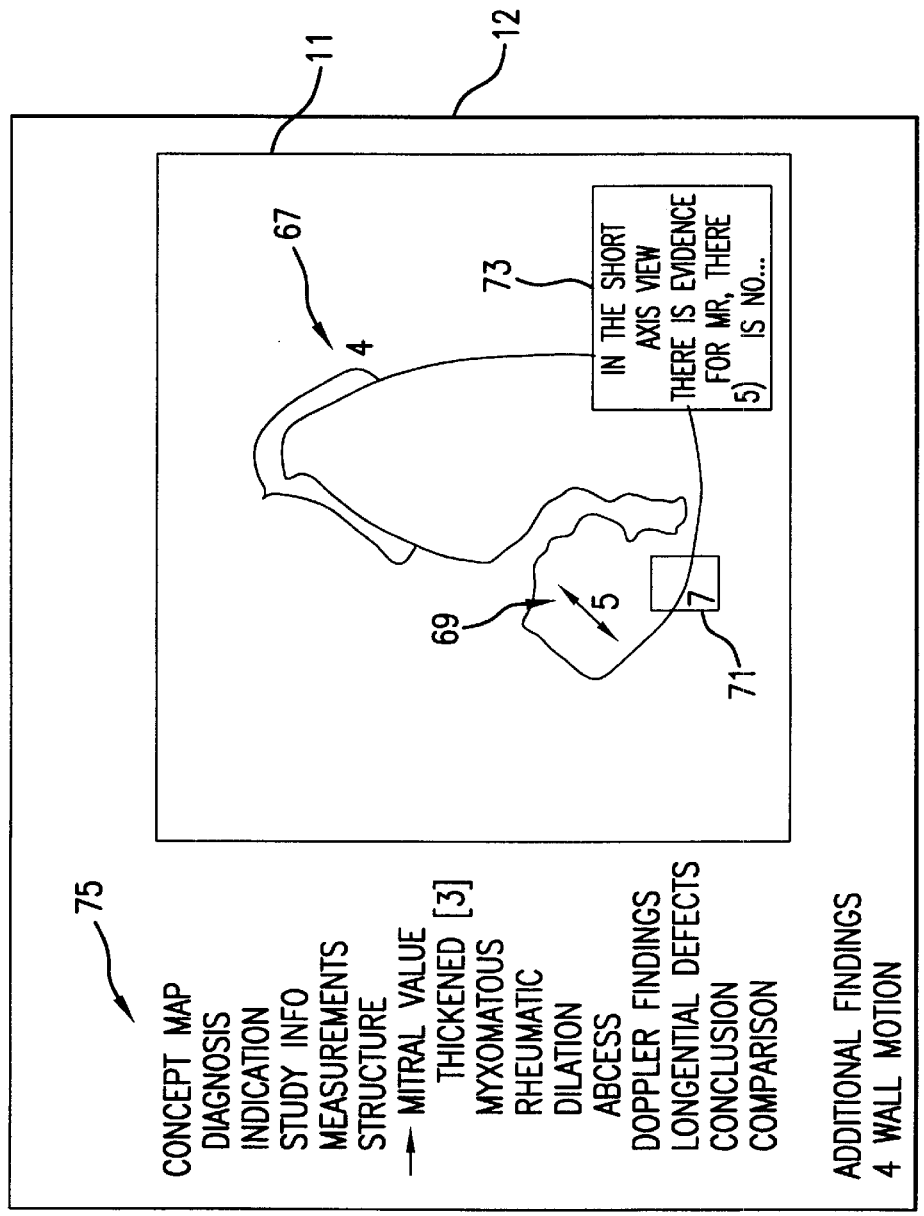
FIG. 4 illustrates a video frame from a teaching session with tagged, or selected and labeled, subframes and their associated commentary.

Referencing FIG. 4, a frame from a teaching or diagnostic session is shown. The image 11 is displayed in totality as an inserted frame in one section of the video frame 12. Selected and labeled first, second and third subframe images or indications 67, 69, and 71 respectively, are overlaid by the interpretation layer on top of the video frame 12. A comment box 73 associated and labeled synonymously with the second sub-frame 69 displays the commentary created at the time the subframe 69 was selected on the image display. A concept map 75 is displayed as a series of text within the video frame 12 to the left of the image 121. The text may be highlighted to indicate current status of the image display topic if desired. The concept map 75 may also be used as a menu to select commentary to be applied to selected subframes which can then be easily indexed according to the text by a database management application for later retrieval. Also, it is possible to build or modify the concept map architecture according to user input, such as the frequency of occurrence of the linking of certain concepts, inquiries, or the like. Automated generation of reports utilizing the diagnostic findings captured by a session according to the present invention is also envisioned.

The concept map may also be used as a tool for calling up additional data associated with the image. Touch screen or cursor selection by a mouse are two exemplary methods of operating the concept map 75. The concept map 75 may also be linked to additional topics by a hierarchical tree, lattice, or semi-lattice of associated terminology for additional association, recordation, and indexing of a session. In alternative embodiments, voice recognition may be used to capture and index natural language commentary with the associated deictic gestures and labeling applied during commentary.

Figure 5:
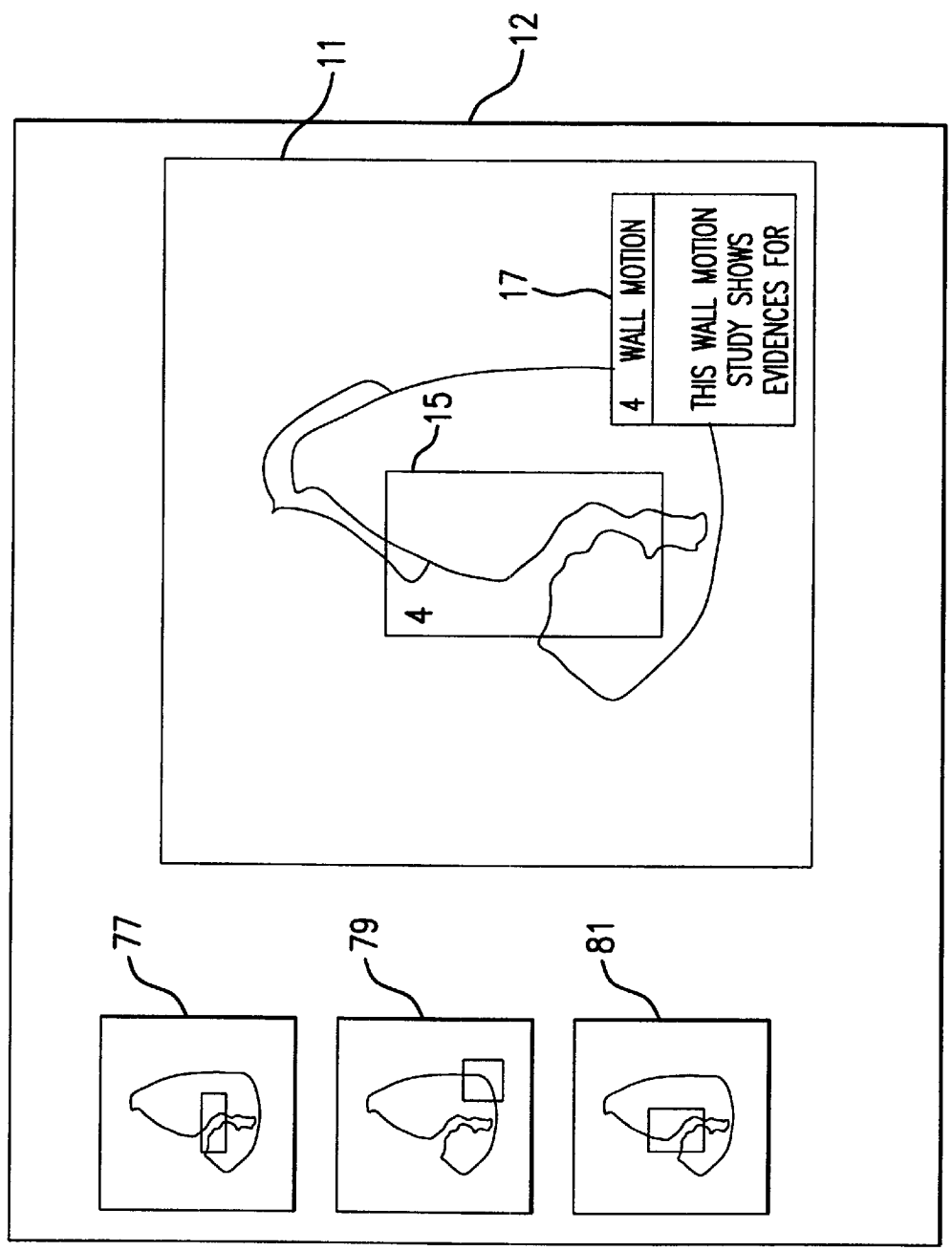
FIG. 5 illustrates a frame from a decision-support session where images of comparable cases are displayed simultaneously with the case under study.

Further referencing FIG. 5, a video frame as used for a decision support mode of the system of the present invention is shown. The video frame 12 includes the image of interest 11 in a large format inserted frame to the right of frame 12 and displays a labeled subframe 15 and its associated comment window 17 as overlaid on the video image layer by the interpretation layer. To the left of the large format inserted frame image 11 are displayed multiple, e.g. first, second, and third, small format inserted frames 77, 79, and 81 of similar images from different sessions to be used for comparison to the image of interest in the present session to arrive at a diagnostic conclusion. The small format images are retrieved from the indexed database by keyword, image pattern recognition, or other known, or later developed means or applications. Image size selection and lay-out, such as two images occupying a split screen, may be varied at the control of the operator if desired. Recordation of additional deictic gestures and associated commentary may be added at any time to any part of the frame 12 by the interpretation layer.

Figure 6:
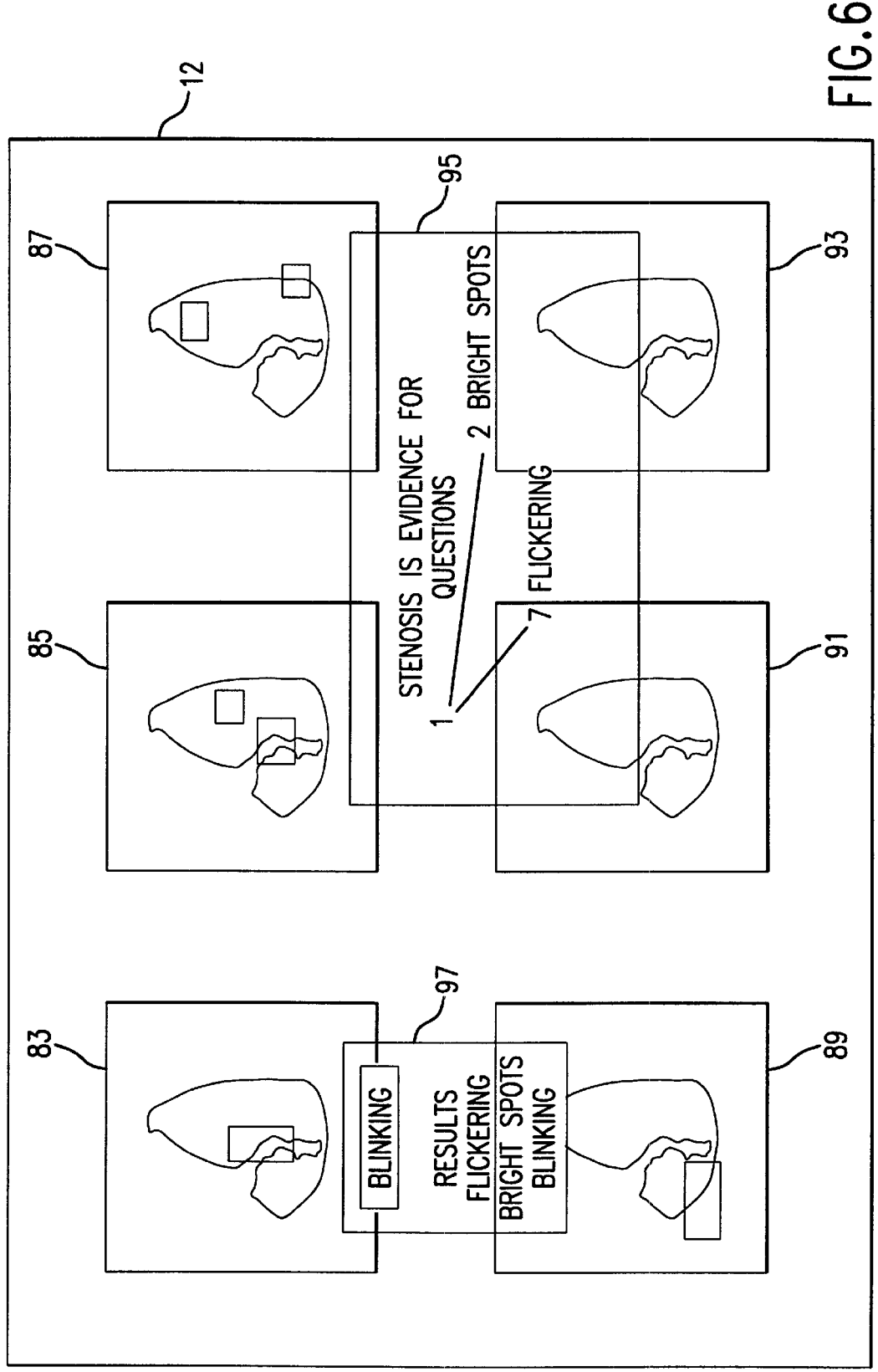
FIG. 6 illustrates a frame from a research session where images from multiple cases are recalled by index topics from a data base.

Referencing FIG. 6, a video frame as used in a pattern finding or research session mode of the system of the present invention is shown. Within the video frame 12, first through sixth multiple small format images from sessions of similar cases 83, 85, 87, 89, 91, and 93, respectively, are displayed. The sessions will have been retrieved from the index database at the command of the operator. An overlay by the interpretation layer has placed a concept map text box 95, showing a semi-lattice of associated concepts, and an associated query text box 97, from the indexing protocol at the disposal of the operator to aid in the research function. Again all deictic gestures and associated comments may be entered and recorded by the interpretation layer during this mode of operation. Additional analytic applications such as statistical analysis programs, automated report production, or the like may be linked to the research session mode if desired.

Having thus described a teaching system for the utilization of full motion video which captures the flow of thought and expression from live teaching sessions and indexes the same for increased dissemination and utilization of the knowledge expressed; it will be appreciated that many variations thereon will occur to the artisan upon an understanding of the present invention, which is therefore to be limited only by the appended claims.

I claim:
1. A diagnostic and teaching aid including:
 a. means for displaying a sequence of images;
 b. means for selecting a portion of one image of the sequence of images via gestures of a diagnostician and means for recording a subframe image selection;
 c. means for recording a commentary of the diagnostician concerning a selected image portion;
 d. means for linking a recorded commentary concerning the selected image portion to the selected image portion;
 e. means for recording a plurality of image portion selections and a sequence in which the plurality of image portion selections were selected so as to create a teaching session; and
 f. means for indexing at least one of the recorded commentary and a selected image portion so as to make the teaching session retrievable through an index.

2. The diagnostic and teaching aid of claim 1 wherein the means for displaying sequence of images includes a digital video processor.

3. The diagnostic and teaching aid of claim 1 wherein the sequence of images are full motion images.

4. The diagnostic and teaching aid of claim 1 wherein the means for selecting a portion of one image includes a mouse.

5. The diagnostic and teaching aid of claim 1 wherein the means for selecting portion of one image includes a keyboard.

6. The diagnostic and teaching aid of claim 1 wherein the means for selecting portion of one image includes a touch screen.

7. The diagnostic and teaching aid of claim 1 wherein the means for recording commentary includes a menu of terminology related to the images.

8. The diagnostic and teaching aid of claim 7 further including means for associating related terms within the menu of terminology.

9. The diagnostic and teaching aid of claim 8 further including means for recording a frequency with which terms are related by the diagnostician and adjusting the menu of terminology according to the frequency.

10. The diagnostic and teaching aid of claim 1 further including means for indexing the selected image portion by automated image pattern recognition.

11. The diagnostic and teaching aid according to claim 1 further including: means for playing back the sequence of images while displaying the plurality of image portion selections and recorded commentary concerning the selected image portions, the play back being in the sequence in which the plurality of image portion selections were selected.

12. A real time diagnostic and teaching aid including:
 a. means for displaying full motion images;
 b. means for selecting subframe images from displayed full motion images in real time via gestures of a diagnostician and means for recording a subframe selection;
 c. means for recording and linking concurrent commentary of the diagnostician to selected subframe images in real time;
 d. means for recording a sequence of subframe selection and linked commentary to create a teaching session;
 e. means for indexing the session by at least one of the commentaries and subframe images;

f. means for play back of the session; and g. means for adding additional commentary into the session.

13. The real time diagnostic and teaching aid according to claim 12 further including means for selecting additional sub-frames during the session playback to create a further session; and means for indexing the further session.

14. The real time diagnostic and teaching aid according to claim 12 further including a separate application layer for overlaying image selection and concurrent commentary on the image data display without disturbing the image data.

15. The real time diagnostic and teaching aid according to claim 12 further including means for displaying more than one session at a time as inserted frames.

16. The real time diagnostic and teaching aid according to claim 12 wherein the means for indexing the further session includes means for indexing by at least one of the concurrent commentary, the additional commentary, and the subframes images.

17. A diagnostic aid or teaching system comprising a computer having:

a. a video layer for the display and quantization of a series of images;

b. an interpretation layer, time synchronized to, and running concurrently with, the video layer, and having a gesture recorder for identifying and recording selected portions of images in the video layer;

c. the interpretation layer further including a comment recorder which records and displays concurrent comments and associates the concurrent comments with the gestures;

d. synchronization means for synchronizing the video layer and the interpretation layer;

e. the interpretation layer overlaid on the video layer so as to be displayed and run concurrently and in synchronization therewith; and f. an index manager for indexing of the comments or the select portions, or both, within a database; and g. whereby a diagnostic or teaching session can be created comprising playback of the series of images concurrently with image portions selected by gestures and the comments associated with the gestures.

18. The diagnostic aid or teaching system of claim 17 further comprising: storage means for recording activity within the interpretation application as synchronized to the video application.

19. A method of producing a teaching session with in-motion video comprising:

a. displaying frames or inserted frames of full motion image data;

b. selecting and recording subframe portions of the image data;

c. appending comments to the selected subframe portions of the image data;

steps "a", "b", and "c" making a session;

d. recording the session; and e. indexing the session.

20. The method of producing a teaching session with in-motion video of claim 19, further comprising: synchronizing the selecting and recording step and the appending step to the display of the full motion image data.

21. The method of producing a teaching session with in-motion video of claim 20, further comprising: step a being performed in a separate application from steps b and c to prevent disturbing the full motion image data.

22. The method of producing a teaching session with in-motion video of claim 20, further comprising: performing steps b) and c) during display of the full motion image data.

23. The method of producing a teaching session with in-motion video of claim 20, further comprising: playing back the recorded session.

24. The method of producing a teaching session with in-motion video of claim 20, further comprising: displaying more than one session at a time as inserted frames.

25. A diagnostic and teaching aid method including the steps of:

a. displaying a sequence of images;

b. selecting a portion of one image of the sequence of images via gestures of a diagnostician;

c. recording a commentary of the diagnostician concerning the image portion selection;

d. linking a recorded commentary concerning an image portion selection to an image portion selection;

e. recording a sequence of a plurality of image portion selections to create a teaching session;

f. indexing at least one of the commentary and selected image portions so as to make the teaching session retrievable through an index; and g. playing back the sequence of images while displaying the plurality of image portion selections and commentary concerning the image portion selections, the play back including the sequence of image portion selection.

* * * * *